US012619277B2

(12) United States Patent
Arikawa et al.

(10) Patent No.: US 12,619,277 B2
(45) Date of Patent: May 5, 2026

(54) COMPUTER SYSTEM AND CONTROL METHOD THEREFOR

(71) Applicant: NTT, Inc., Tokyo (JP)

(72) Inventors: Yuki Arikawa, Tokyo (JP); Naoki Miura, Tokyo (JP); Kenji Tanaka, Tokyo (JP); Tsuyoshi Ito, Tokyo (JP); Takeshi Sakamoto, Tokyo (JP); Yusuke Muranaka, Tokyo (JP)

(73) Assignee: NTT, INC., Tokyo (JP)

( * ) Notice: Subject to any disclaimer, the term of this patent is extended or adjusted under 35 U.S.C. 154(b) by 55 days.

(21) Appl. No.: 18/699,179

(22) PCT Filed: Nov. 12, 2021

(86) PCT No.: PCT/JP2021/041776
§ 371 (c)(1),
(2) Date: Apr. 5, 2024

(87) PCT Pub. No.: WO2023/084748
PCT Pub. Date: May 19, 2023

(65) Prior Publication Data
US 2024/0402756 A1     Dec. 5, 2024

(51) Int. Cl.
G06F 1/12          (2006.01)
G06F 11/30         (2006.01)

(52) U.S. Cl.
CPC ............ G06F 1/12 (2013.01); G06F 11/3072 (2013.01)

(58) Field of Classification Search
CPC .. G06F 11/34; G06F 11/3072; G06F 11/3476; G06F 1/12; G06F 1/10; G06F 1/08; G06F 15/82
See application file for complete search history.

(56) References Cited

U.S. PATENT DOCUMENTS

| | | | |
|---|---|---|---|
| 7,779,340 B2 * | 8/2010 | Milne | H04L 43/106 |
| | | | 714/799 |
| 10,282,926 B2 * | 5/2019 | Deville | G06F 11/3055 |
| 2009/0125756 A1 * | 5/2009 | Swaine | G06F 11/3476 |
| | | | 714/45 |

(Continued)

FOREIGN PATENT DOCUMENTS

EP          2933756 A1 * 10/2015  .......... H03M 7/4006

OTHER PUBLICATIONS

Nippon Telegraph and Telephone Corporation, "NTT Technology Report for Smart World 2020," May 28, 2020, 28 pages.

(Continued)

*Primary Examiner* — Raymond N Phan
(74) *Attorney, Agent, or Firm* — Slater Matsil, LLP

(57)          ABSTRACT

An embodiment is a computer system which processes input data which includes a plurality of arithmetic parts; and a host part connected to the plurality of arithmetic parts and configured to control the plurality of arithmetic parts, in which the processed data is transferred between the plurality of arithmetic parts, the arithmetic part includes trace parts which record trace data using detection of a predetermined event from the input data as a trigger, the trace data has a timestamp value which is a detection time of the event based on an operating frequency of the arithmetic part, and the timestamp values of the plurality of arithmetic parts are synchronized.

17 Claims, 13 Drawing Sheets

(56)                    References Cited

U.S. PATENT DOCUMENTS

| | | | | |
|---|---|---|---|---|
| 2010/0002080 | A1* | 1/2010 | Maki .................... | H04N 19/124 |
| | | | | 348/148 |
| 2010/0281308 | A1* | 11/2010 | Xu ...................... | G06F 11/3636 |
| | | | | 714/45 |
| 2022/0342794 | A1* | 10/2022 | Tsuchikawa ........ | G06F 11/3476 |

OTHER PUBLICATIONS

Takano et al., "Flow-centric Computing Leveraged by Photonic Circuit Switching for the Post-Moore Era," 2016 Tenth IEEE/ACMInternational Symposium onNetworks-on-Chip (NOCS), Aug. 31, 2016, 3 pages.

* cited by examiner

Fig. 7A

| Timestamp:Dec, | Timestamp:0x, | Ins, | Evt, | Dec, | TID | , | EventData |
|---|---|---|---|---|---|---|---|
| 6983, | 1b47, | f0, | 07, | HLR-, | 00000000, | | 00000000 |
| 6996, | 1b54, | f1, | 07, | HLR-, | 00000000, | | 00000000 |
| 401563, | 6209b, | f0, | 05, | H-R-, | 00000001, | | 00000000 |
| 401564, | 6209c, | 10, | 05, | H-R-, | 00000001, | | 00000000 |
| 401656, | 620f8, | 11, | 05, | H-R-, | 00000001, | | 00000000 |
| 402995, | 62633, | f1, | 05, | H-R-, | 00000000, | | 00000000 |
| 404019, | 62a33, | f1, | 06, | -LR-, | 00000000, | | 00000000 |
| 418315, | 6620b, | f1, | 05, | H-R-, | 00000000, | | 00000000 |
| 419339, | 6660b, | f1, | 06, | -LR-, | 00000000, | | 00000000 |
| 428625, | 68a51, | f1, | 05, | H-R-, | 00000000, | | 00000000 |
| 429649, | 68e51, | f1, | 06, | -LR-, | 00000000, | | 00000000 |
| 438909, | 6b27d, | f1, | 05, | H-R-, | 00000000, | | 00000000 |
| 439933, | 6b67d, | f1, | 06, | -LR-, | 00000000, | | 00000000 |
| 448499, | 6d7f3, | f1, | 05, | H-R-, | 00000000, | | 00000000 |
| 449523, | 6dbf3, | f1, | 06, | -LR-, | 00000000, | | 00000000 |
| 457367, | 6fa97, | f1, | 05, | H-R-, | 00000000, | | 00000000 |
| 458391, | 6fe97, | f1, | 06, | -LR-, | 00000000, | | 00000000 |
| 466369, | 71dc1, | f1, | 05, | H-R-, | 00000000, | | 00000000 |
| 467393, | 721c1, | f1, | 06, | -LR-, | 00000000, | | 00000000 |
| 475235, | 74063, | f1, | 05, | H-R-, | 00000000, | | 00000000 |
| 476259, | 74463, | f1, | 06, | -LR-, | 00000000, | | 00000000 |
| 484240, | 76390, | f1, | 05, | H-R-, | 00000000, | | 00000000 |
| 485264, | 76790, | f1, | 06, | -LR-, | 00000000, | | 00000000 |
| 493267, | 786d3, | f1, | 05, | H-R-, | 00000000, | | 00000000 |
| 494291, | 78ad3, | f1, | 06, | -LR-, | 00000000, | | 00000000 |
| 502432, | 7aaa0, | f1, | 05, | H-R-, | 00000000, | | 00000000 |
| 503456, | 7aea0, | f1, | 06, | -LR-, | 00000000, | | 00000000 |
| 511523, | 7ce23, | f1, | 05, | H-R-, | 00000000, | | 00000000 |
| 512547, | 7d223, | f1, | 06, | -LR-, | 00000000, | | 00000000 |
| 520549, | 7f165, | f1, | 05, | H-R-, | 00000000, | | 00000000 |
| 521573, | 7f565, | f1, | 06, | -LR-, | 00000000, | | 00000000 |
| 529688, | 81518, | f1, | 05, | H-R-, | 00000000, | | 00000000 |
| 530712, | 81918, | f1, | 06, | -LR-, | 00000000, | | 00000000 |
| 538726, | 83866, | f1, | 05, | H-R-, | 00000000, | | 00000000 |
| 539750, | 83c66, | f1, | 06, | -LR-, | 00000000, | | 00000000 |
| 547790, | 85bce, | f0, | 06, | -LR-, | 00000001, | | 00000000 |
| 547791, | 85bcf, | 10, | 06, | -LR-, | 00000001, | | 00000000 |
| 547794, | 85bd2, | 11, | 06, | -LR-, | 00000001, | | 00000000 |
| 547796, | 85bd4, | f1, | 05, | H-R-, | 00000000, | | 00000000 |
| 548820, | 85fd4, | f1, | 06, | -LR-, | 00000000, | | 00000000 |

41

42

COMPUTER SYSTEM AND CONTROL METHOD THEREFOR

CROSS-REFERENCE TO RELATED APPLICATIONS

This patent application is a national phase filing under section 371 of PCT/JP2021/041776, filed Nov. 12, 2021, which application is hereby incorporated herein by reference in its entirety.

TECHNICAL FIELD

The present invention relates to a computer system having a plurality of arithmetic parts and a control method thereof.

BACKGROUND

Technological innovation is progressing in many fields such as machine learning, artificial intelligence (AI), and the Internet of Things (IoT). In addition, the sophistication of services and the provision of added value are being actively carried out by utilizing various information and data. Such processing requires a large amount of calculation and an information processing infrastructure for that is essential.

For example, although an attempt has been made to update existing information processing infrastructures in NPL 1, current computers cannot cope with the rapidly increasing amount of data. In order for future development, it has been pointed out that a "post-Moore technique" which goes beyond Moore's law needs to be established.

As a post-Moore technique, for example, NPL 2 discloses a technique called flow-centric computing. Flow-centric computing introduces the new concept of moving data to a place in which the computing power resides, rather than the traditional computing idea of doing processing where the data resides.

In order to realize the above flow-centric computing, not only is a broadband communication network necessary for data movement necessary, but in addition, in order to obtain the desired computational performance, it is necessary to efficiently control computational resources.

Flow-centric computing (for example, NPL 2) discloses a technique for interlocking a plurality of arithmetic functions.

CITATION LIST

Non Patent Literature

[NPL 1] "NTT Technology Report for Smart World 2020," Nippon Telegraph and Telephone Corporation, 2020. https://www.rd.ntt/_assets/pdf/techreport/ NTT_TRFSW_2020_EN_W.pdf.
[NPL 2] R. Takano and T. Kudoh, "Flow-centric computing leveraged by photonic circuit switching for the post-moore era, "Tenth IEEE/ACM International Symposium on Networks-on-Chip (NOCS), Nara, 2016, pp. 1-3. Https://ieeexplore.ieee.org/abstract/document/7579339.

Technical Problem

SUMMARY

However, in a computer system in which a plurality of arithmetic parts work together, it has been difficult to identify a fault which has occurred in the arithmetic parts because the arithmetic parts independently move data without going through a host part.

In addition, it is difficult to ascertain an internal state of a computer system such as identifying an arithmetic part through which input data has passed at a certain time.

Solution to Problem

In order to solve the problems described above, a computer system according to embodiments of the present invention is a computer system which processes input data which includes a plurality of arithmetic parts; and a host part connected to the plurality of arithmetic parts and configured to control the plurality of arithmetic parts, in which the processed data is transferred between the plurality of arithmetic parts, the arithmetic part includes trace parts which record trace data using detection of a predetermined event from the input data as a trigger, the trace data has a timestamp value which is a detection time of the event based on an operating frequency of the arithmetic part, and the timestamp values of the plurality of arithmetic parts are synchronized.

Also, a control method of a computer system according to embodiments of the present invention is a control method of a computer system which includes a plurality of arithmetic parts and a host part, in which the plurality of arithmetic parts obtain a timestamp value on the basis of an operating frequency of the arithmetic parts using detection of a predetermined event from input data as a trigger, and the data is processed and recorded, the method including: a step of setting, by the host part, a predetermined value to the timestamp value; a step of comparing, by the host part, the timestamp value with a reference value; and a step of setting, by the host part, the timestamp value to the predetermined value when the timestamp value exceeds an allowable range of the reference value.

Furthermore, a control method of a computer system according to embodiments of the present invention is a control method of a computer system which includes a plurality of arithmetic parts and a host part, in which the plurality of arithmetic parts obtain a timestamp value on the basis of an operating frequency of the arithmetic parts using detection of a predetermined event from input data as a trigger, and the data is processed and recorded, and in which either one of the host part and the arithmetic parts multiplies a timestamp value acquired by each of the other arithmetic parts by a coefficient set in each of the other arithmetic parts so that an operating frequency of one arithmetic part of operating frequencies of the plurality of arithmetic parts is the same as operating frequencies of the other arithmetic parts.

Advantageous Effects of Invention

According to the present invention, it is possible to provide a computer system and a control method thereof which can easily identify the location of the failure when the failure has occurred and ascertain an internal data status at the time of the failure.

BRIEF DESCRIPTION OF THE DRAWINGS

FIG. 7A is a diagram for explaining an example of a computer system control method according to the first embodiment of the present invention.

DETAILED DESCRIPTION OF ILLUSTRATIVE EMBODIMENTS

First Embodiment

A computer system and a control method thereof according to a first embodiment of the present invention will be described with reference to FIGS. 1 to 3.
<Configuration of Computer System>

Figure 1:
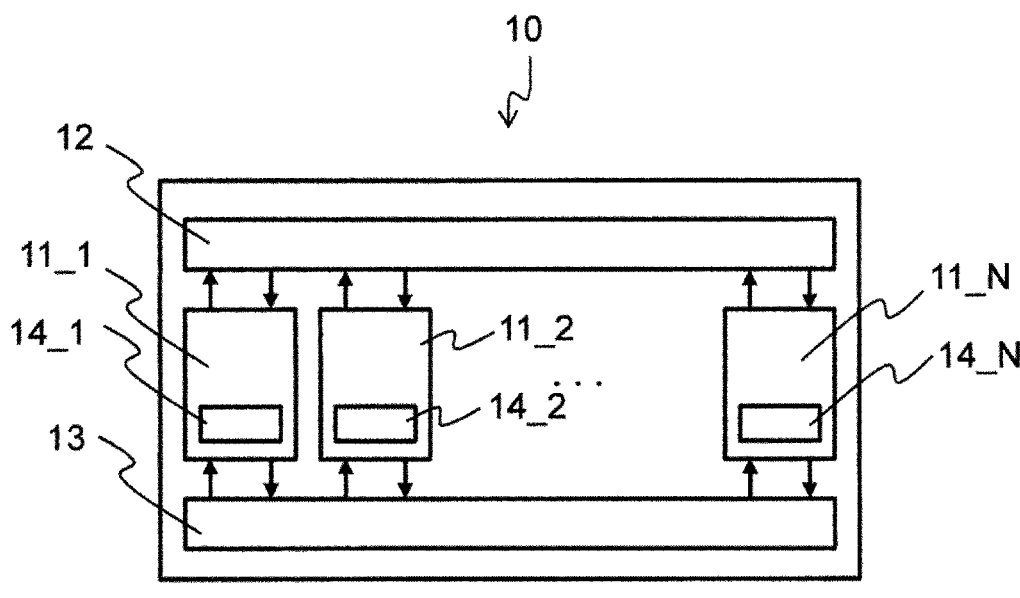
FIG. 1 is a block diagram showing a configuration of a computer system according to a first embodiment of the present invention.

As shown in FIG. 1, a computer system 10 according to this embodiment includes N arithmetic parts 11_1 to 11_N (N is an integer of 1 or more), an internal communication part 13 connecting the arithmetic parts 11_1 to 11_N, and a host part 12 for setting and managing operation parameters with respect to the arithmetic parts 11_1 to 11_N.

The arithmetic parts 11_1 to 11_N are configured of processors, accelerators, and the like and include trace parts 14_1 to 14_N.

When the arithmetic parts 11_1 to 11_N are interlocked, the trace parts 14_1 to 14_N record event detection times based on the operating frequencies of the arithmetic parts 11_1 to 11_N, using the detection of a predetermined event as a trigger of an event at an arbitrary observation point of the arithmetic parts 11_1 to 11_N.

When the arithmetic parts 11_1 to 11_N are interlocked, the trace parts 14_1 to 14_N record event detection times based on the operating frequencies of the arithmetic parts 11_1 to 11_N, using the detection of a predetermined event as a trigger of an event at an arbitrary observation point of the arithmetic parts 11_1 to 11_N.

In interlocking of the arithmetic parts 11_1 to 11_N, the data processed by the arithmetic part 11_1 is transferred to the arithmetic part 11_2 via the internal communication part 13. Subsequently, the data transfer is repeated and the data is transferred to the arithmetic part 11_N.

In interlocking of the arithmetic parts 11_1 to 11_N, the data processed by the arithmetic part 11_1 is transferred to the arithmetic part 11_2 via the internal communication part 13. Subsequently, the data transfer is repeated and the data is transferred to the arithmetic part 11_N.

The arithmetic parts 11_1 to 11_N (N is an integer of 1 or more) have a function of executing predetermined arithmetic processing on input data input from the outside of the computer system 10. Arithmetic processing is, for example, general arithmetic processing such as processing, aggregation, and combination of input data such as processing to reduce/enlarge image size when image data is input, processing to detect specific objects from image data and processing to decrypt/encrypt image data.

Furthermore, the arithmetic parts 11_1 to 11_N may be added or deleted regardless of whether the system is stopped or in operation. For example, it can be realized by using an FPGA which is a dynamically reconfigurable device for only a part of the arithmetic part. Furthermore, as a method of installing the arithmetic parts 11_1 to 11_N, an accelerator card having a dedicated circuit specialized for specific calculation may be added. Moreover, it is also possible to provide a plurality of calculators which provide calculation functions in the arithmetic part.

The host part 12 has a function of setting and managing operation parameters for the arithmetic parts 11_1 to 11_N and more specifically has a function of controlling the arithmetic parts 11_1 to 11_N and a function of storing data. The operation parameter is, for example, information for specifying an algorithm when switching between a plurality of algorithms in image processing such as coefficients and threshold values in arithmetic processing.

In addition, when it is possible to add or delete the operation part even after the system has started operation, the host part 12 manages the entire computer system 10 such as setting circuit information for performing desired processing content for the arithmetic part.

The internal communication part 13 connects the arithmetic parts 11_1 to 11_N and has a communication function for exchanging data among the arithmetic parts 11_1 to 11_N. Specifically, commercial communication standards such as PCIe and Ethernet and physical configurations which satisfy the communication standards, that is, PCIe switches and Ethernet switches, can be mentioned.

Furthermore, when a plurality of arithmetic parts providing computing functions are provided in the arithmetic parts 11_1 to 11_N, a plurality of the observation points may be provided in the arithmetic parts 11_1 to 11_N.
<Configuration of Arithmetic Part>

Figure 2:
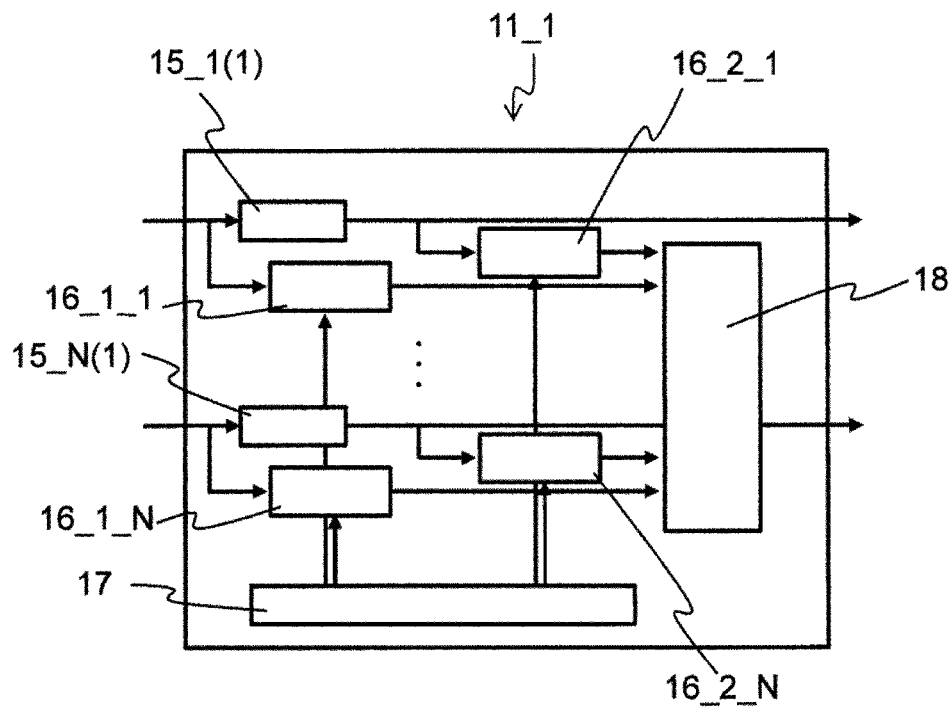
FIG. 2 is a block diagram showing a configuration of an arithmetic part in the computer system according to the first embodiment of the present invention.

The arithmetic part 11_1 in the computer system 10 includes, as shown in FIG. 2, a plurality of (N) arithmetic parts 15_1(1) to 15_N(1) and a trace part 14_1. Here, the number of arithmetic parts may be one.

The trace part 14_1 includes event generators 16_1_1 to 16_2_N, a timestamp part 17, and a trace buffer 18.

The event generators 16_1_1 to 16_2_N are connected to the input side and the output side of the calculators 15_1(1) to 15_N(1), respectively. The output of the timestamp part 17 is connected to event generators 16_1_1 to 16_2_N. Outputs of event generators 16_1_1 to 16_2_N are connected to the trace buffer 18.

Here, the event generators 16_1_1 to 16_2_N may be placed on either the input side or the output side of the calculators 15_1(1) to 15_N(1) and may be placed at any location. In addition, at least one event generator may be disposed. Furthermore, a plurality of trace buffers 18 may be arranged and at least one may be disposed.

The event generators 16_1_1 to 16_2_N are inserted in arbitrary positions of the arithmetic parts 11_1 to 11_N, events (head and end of stream) for each data type (user ID, session ID, stream ID, service ID) are detected, and a trigger is generated to record trace data including the detection time (hereinafter referred to as "timestamp value") in a trace buffer 18, which will be described later.

Furthermore, the type of data is not limited to the above and any information which can be used for organizing data such as header information of packets used for organizing data, information of signals running parallel to data, and the like can be applied.

The timestamp part 17 has at least one clock counter, synchronizes the plurality of event generators 16_1_1 to 16_2_N (observation points), and acquires the time with the accuracy of the operating frequency of the arithmetic parts 11_1 to 11_N. Here, the operating frequency (clock frequency) of the arithmetic parts 11_1 to 11_N is usually about several nanoseconds when the function is realized using a field-programmable gate array (FPGA).

The trace buffer 18 records trace data using event detection using the event generators 16_1_1 to 16_2_N as a trigger of an event. Here, the trace data includes each detection time (timestamp value) acquired from the timestamp part 17, an instance ID, an event type (event ID), a data type (TID), and arbitrary data. Here, the trace data needs to have at least a timestamp value.

Also, the trace buffer 18 provides a constant amount of buffer, independent of the number of event generators.

Here, the timestamp value is a value which is unified within the arithmetic unit (FPGA).

Furthermore, an instance ID is an ID which identifies the event generator instance and indicates the location (observation point) in which the event is detected.

In addition, the event type (event ID) is an ID which distinguishes event contents. For example, the distinction is made by passing the head of the stream or passing the end of the stream. Also, an event detection flag or the like is prepared at an arbitrary location of the data to detect that the flag has passed.

Moreover, arbitrary data is data which is usually processed by a computer system such as image data, numerical data, and text data.

Also, the data type is used for, for example, identifying and classifying attributes of input data and is information attached to the data itself such as a user ID, a session ID, a stream ID, and a service ID. Furthermore, the information for identifying the data type does not necessarily have to be added to the header of the packet and may be uniquely defined in, for example, the payload of the packet. Furthermore, when a signal running parallel to data is used inside the arithmetic unit, the parallel running signal may be used for acquiring the data type.

<Operation of Computer System>

An operation of the computer system 10 according to this embodiment will be described below.

In the arithmetic part 11_1 of the computer system 10, data are input to arithmetic parts 15_1(1) to 15_N(1). Input data is composed of various elements and includes an event type (event ID), a data type (TID), and arbitrary data.

Here, the data processed by the calculator 15_1(1) of the arithmetic part 11_1 is transmitted and input to the calculator 15_1(2) of the arithmetic part 11_2.

In event generators 16_1_1 to 16_2_N, first, control signals (operations) of data to be input to arithmetic parts 11_1 to 11_N are observed.

When the event generators 16_1_1 to 16_2_N detect an event, the event generators 16_1_1 to 16_2_N acquire the event type, data type, and arbitrary data from the input data. Here, event occurrence is, for example, when the head of the stream has passed or when the head of the stream has passed.

The event generators 16_1_1 to 16_2_N add the instance ID and the timestamp value transmitted from the timestamp part 17 to the acquired event type, data type, and arbitrary data. As a result, the trace data is composed of a timestamp value, an instance ID, an event type, a data type, and arbitrary data.

Here, the trace data needs to include at least a timestamp value, and information in the computer system such as a processing time and a data flow rate can be ascertained on the basis of the timestamp value. Also, the time when a failure occurred can be grasped.

Furthermore, the trace data has an instance ID so that it is possible to ascertain a place in which a failure occurred.

In addition, the trace data has an event type so that it is possible to ascertain when an event occurs.

In addition, since the trace data has data types, it is possible to ascertain an operation state for each data type and use it for determination (which will be described later) when erasing data.

In addition, trace data can be used when processing is restarted (which will be described later) by having arbitrary data.

In addition, trace data can be used for management of trace data based on priority by having service priority information.

Finally, event generators 16_1_1 to 16_2_N send trace data to a trace buffer 18.

Also, the timestamp part 17 receives (writes) the count start or stop setting transmitted from the host part 12.

The clock counter is set to start or stop counting using this as a trigger of an event.

Counting is started by the count start setting and the counting is executed on the basis of the operating frequencies of the respective arithmetic parts 11_1 to 11_N. On the other hand, counting is stopped by the count stop setting.

If the event generators 16_1_1 to 16_2_N detect an event, the time counted by the clock counter is read as a timestamp value and the timestamp value is transmitted to the event generators 16_1_1 to 16_2_N.

Furthermore, in event detection, for example, an event is detected by performing a determination using ON/OFF of a signal which indicates whether the data is valid among the signals which run in parallel with the data or preparing a field for event detection in a specific region of data and using the bit string of the field.

Here, synchronization is performed between the arithmetic parts (FPGA) as necessary. Note that, as a method of synchronizing the operation parts, synchronization is achieved by inputting a signal for synchronization or a reset signal from the host part to the operation parts to be synchronized.

Also, when reading trace data from the trace buffer 18, the host part 12 transmits a reset signal to the timestamp part 17 to reset the value of the clock counter.

In the trace buffer 18, trace data received from the event generators 16_1_1 to 16_2_N are recorded and accumulated in the trace buffer 18.

Here, trace data transmitted from a plurality of event generators 16_1_1 to 16_2_N are recorded. In addition, writing and reading of trace data are executed by first-in first-out (FIFO) common to all TIDs.

Subsequently, the host part 12 reads the trace data from the trace buffer 18.

Finally, the host part 12 performs post-processing of the read (collected) data. In detail, search (GREP) is performed for each TID. Subsequently, it is visualized after sorting by the timestamp part 17.

Here, although an example in which the event generator acquires the event type, the data type, and the arbitrary data from the input data when an event is detected has been shown, even if the event type, the data type, and the arbitrary data are not acquired, the computer system 10 can be operated by acquiring at least the timestamp value as described above.

<Addition/Deletion of Operation Part and Operation Part>

In the computer system 10, the arithmetic parts 11_1 to 11_N can be added or deleted regardless of whether the computer system 10 is stopped or in operation.

Figure 3A:
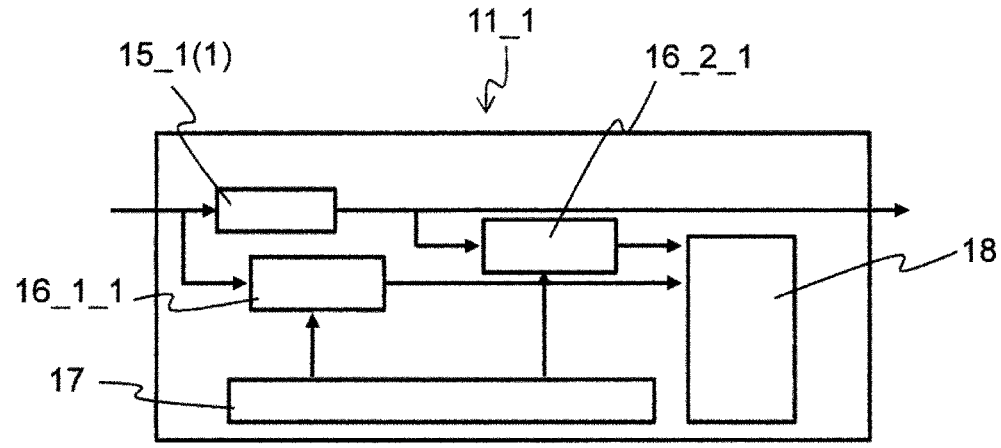
FIG. 3A is a diagram for explaining expansion and contraction of an arithmetic part in the computer system according to the first embodiment of the present invention.
Figure 3B:
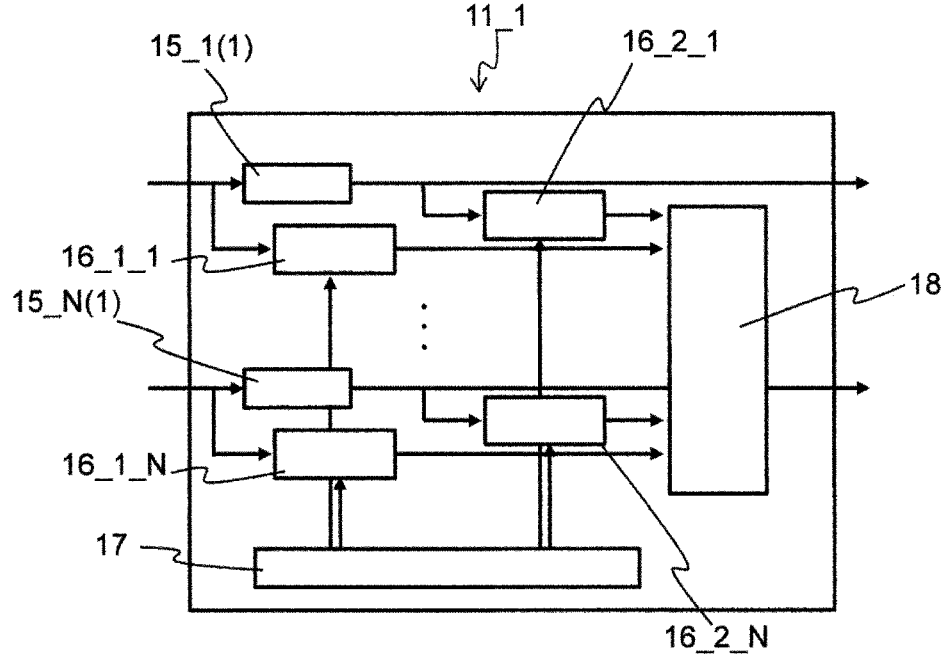
FIG. 3B is a diagram for explaining expansion and contraction of an arithmetic part in the computer system according to the first embodiment of the present invention.

Furthermore, for example, in the arithmetic part 11_1 shown in FIG. 3A, as shown in FIG. 3B, the calculators 15_1(1) to 15_N(1) can be added by newly arranging (adding) the event generators 16_1_2 to 16_2_N and connecting them to the timestamp part 17 and the trace buffer 18.

Furthermore, the arithmetic parts 15_1(1) to 15_N(1) can be deleted by deleting the event generators 16_1_2 to 16_2_N in the arithmetic part 11_1.

When the arithmetic parts 15_1(1) to 15_N(1) are added, a plurality of event generators 16_1_1 to 16_2_N can be arranged at arbitrary locations in trace parts 14_1 to 14_N.

Here, the event generators 16_1_1 to 16_2_N may be placed both before the input stage and after the output stage of the arithmetic parts 15_1(1) to 15_N(1), or either before the input stage or after the output stage.

When deleting the calculators 15_1(1) to 15_N(1), the event generators 16_1_1 to 16_2_N before and after the calculators 15_1(1) to 15_N(1) may be deleted in the trace parts 14_1 to 14_N.

Here, both event generators before the input stage and after the output stage of the computing elements 15_1(1) to 15_N(1) to be deleted may be deleted and either one of the event generators before the input and after the output may be deleted.

According to this embodiment, a plurality of event generators can be added anywhere. Thus, by newly adding only the event generator, it is possible to easily add a new arithmetic part inside the arithmetic part and it becomes possible to measure the processing time in the arithmetic part and collect the trace data.

In addition, since a plurality of event generators can be deleted from an arbitrary location, if only event generators are deleted, arithmetic parts can be easily deleted inside the arithmetic part.

Moreover, when adding an arithmetic part, the circuit scale can be reduced and power consumption can be reduced compared to the case in which all of the event generator, the timestamp part, and the trace buffer are added.

Furthermore, when removing the arithmetic part from the arithmetic part, the event generators arranged before and after the arithmetic part may be removed. At this time, trace data relating to the event generator may be deleted. Also, the trace data attached to the event detected by the event generator to be deleted does not necessarily have to be deleted.

First Example

Figure 4A:
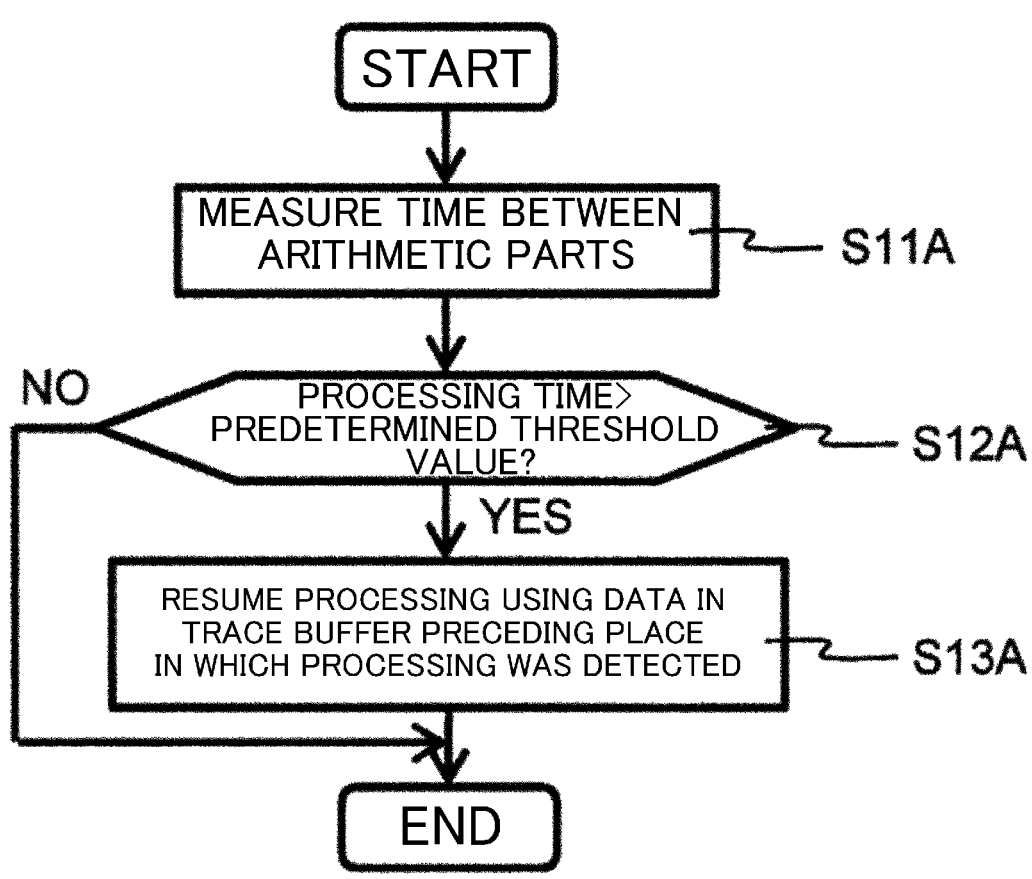
FIG. 4A is a flowchart diagram for explaining a control method of the computer system according to the first embodiment of the present invention.
Figure 4B:
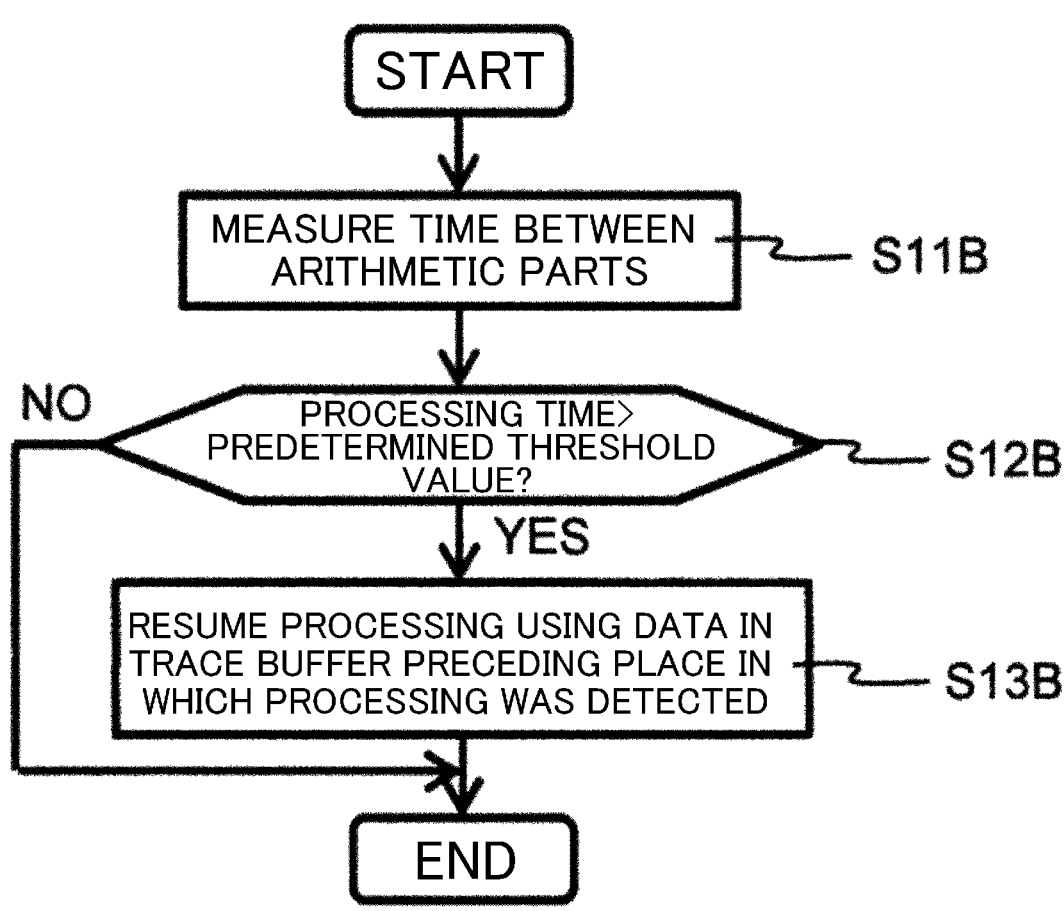
FIG. 4B is a flowchart diagram for explaining the control method of the computer system according to the first embodiment of the present invention.

A control method of the computer system 10 according to the first embodiment of the present invention will be described with reference to FIGS. 4A and 4B.

In this example, in the computer system 10, the trace data recorded by the trace parts 14_1 to 14_N of the arithmetic parts 11_1 to 11_N are used for efficiently restarting processing when a failure occurs. Here, the failure includes a packet loss which can normally occur, a stack of processing in the internal functional blocks of the arithmetic parts 11_1 to 11_N, and the like.

In the computer system 10, for example, the trace part 14_1 of the arithmetic part 11_1 records, as arbitrary trace data in the trace buffer 18, a timestamp value, an instance ID (information indicating the location in which an event is detected), and arbitrary data.

As an example of the control method of the computer system 10 according to this example, a case in which the host part 12 controls (manages) will be described with reference to FIG. 4A.

First, the host part 12 monitors the trace buffer 18 of the computer system at a predetermined cycle and measures the processing time in the arithmetic part (Step S11A).

Here, in measuring the processing time, first, the host part 12 reads (obtains), from the trace buffer 18, the first timestamp value and the second stamp value using detection of a predetermined event (first event, second event) of each of the event generator 16_1_1 (first event generator) on the input side of calculator 15_1(1) and the event generator 16_2_1 (second event generators) on the output side of the calculator 15_1(1) as a trigger of an event.

Subsequently, the host part 12 calculates the processing time from the difference between the first timestamp value and the second stamp value.

In this way, the processing time of an arbitrary place (interval, for example, computing element 15_1(1)) is acquired using a difference between the times (first timestamp value and second stamp value) at which the input data passes through each of the event generators arranged at an arbitrary place (section, for example, before and after the calculator 15_1(1)).

Subsequently, the measured processing time is compared with a predetermined threshold value (Step S12A). As a result, when the processing time is longer than a predetermined threshold value, it is determined that a failure has occurred.

Finally, when a failure occurs, the process detection place is ascertained from the instance ID and the process is resumed using arbitrary data recorded in any trace buffer 18 preceding the process detection place (Step S13A).

Furthermore, as an example of the control method of the computer system 10 according to this example, a case in which the arithmetic parts 11_1 to 11_N control (manage) will be described with reference to FIGS. 4B and 4C.

First, the arithmetic parts 11_1 to 11_N record trace data, monitor the trace buffer 18 at a predetermined cycle, and measure time (hereinafter referred to as "processing time between arithmetic parts") until data is input to computing element 15_1(2) of the next-stage arithmetic part (for example, arithmetic part 11_2) after the timestamp value is recorded in the trace buffer 18 of an arbitrary arithmetic part (for example, arithmetic part 11_1) (Step S11B).

Figure 4C:
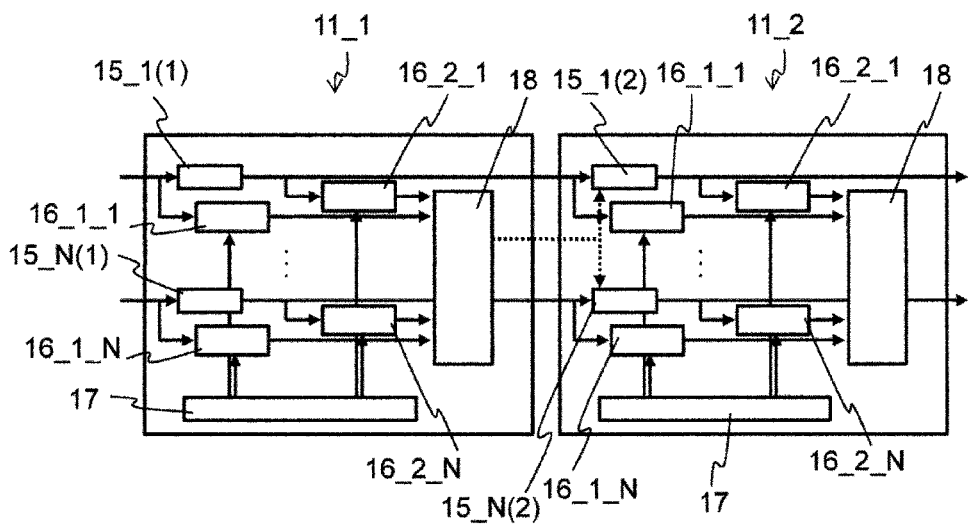
FIG. 4C is a diagram for explaining the control method of the computer system according to the first embodiment of the present invention.

In measuring the processing time between these arithmetic parts, for example, as shown in FIG. 4C, first, the event generator 16_2_1 in the preceding stage of the trace buffer 18 of the arithmetic part 11_1 acquires the timestamp value (first stamp value) and records it in the trace buffer 18 of the arithmetic part 11_1.

Subsequently, a notification signal is transmitted from the trace buffer 18 of the arithmetic part 11_1 to the arithmetic part 15_1(2) of the arithmetic part 11_2 (dotted arrow in the drawing) and data is transferred from the calculator 15_1(1) of the arithmetic part 11_1 to the calculator 15_1(2) of the arithmetic part 11_2 using this signal as a trigger of an event.

Subsequently, using the detection of an event in the data input to the calculator 15_1(2) of the arithmetic part 11_2 as a trigger of an event, the event generator 16_1_1 in the preceding stage of the calculator 15_1(2) of the arithmetic part 11_2 acquires the timestamp value (second stamp value) and records it in the trace buffer 18 of the arithmetic part 11_2.

The processing time between the arithmetic parts is measured from the difference between the first stamp value and the second stamp value.

Subsequently, the measured processing time is compared with a predetermined threshold value (Step S12B). As a result, when the measured time is longer than a predetermined threshold value, it is determined that a failure has occurred.

Finally, when a failure occurs, the process is restarted using any data recorded in any trace buffer 18 preceding the process detection place ascertained by the instance ID recorded in the trace buffer 18 (Step S13B).

Here, although an example of measuring the processing time using the timestamp value recorded in the trace buffer was shown, the timestamp value obtained by the event generator may be directly used for measuring the processing time.

In this way, in the control method of the computer system according to this example, an event generator placed in the arbitrary place detects a given event, one timestamp value is acquired using this as a trigger, event generators placed at other locations similarly acquire other timestamp values, the occurrence of a problem is determined by calculating the difference between one timestamp value and another timestamp value, and processing is restarted.

According to the control method of the computer system according to this example, by using the trace data recorded by the trace units 14_1 to 14_N, when a problem occurs, the process can be restarted by going back to the point where it was operating normally, without restarting the process from the beginning.

In addition, the host part 12 manages the trigger for resuming the trace data processing. Alternatively, it may be managed by the arithmetic parts 11_1 to 11_N.

Furthermore, the resumption of processing does not necessarily need to be limited to a specific functional block. In addition, for example, resumption of processing may be traced back to the input of the arithmetic part.

Although an example of ascertaining the processing detection location by the instance ID was shown in this example, the present invention is not limited to this. In addition, a processing detection place may be derived using a preset processing speed of an arithmetic part and a measured timestamp value.

Although an example of using the processing time is shown in order to ascertain the occurrence of a failure in this example, the data flow rate (which will be described later) or the like may be used without being limited to this.

In this example, the trace data may have a data type and an event type. Also, trace data may be recorded for each data type or event type.

Second Example

A control method of a computer system according to a second example of the present invention will be described with reference to FIG. 5. In this example, in the computer system, trace parts 14_1 to 14_N of arithmetic parts 11_1 to 11_N are used for performing system quality control (state management/health check).

In the computer system 10, for example, the trace part 14_1 of the arithmetic part 11_1 includes a plurality of event generators 16_1_1 to 16_2_N.

Figure 5:
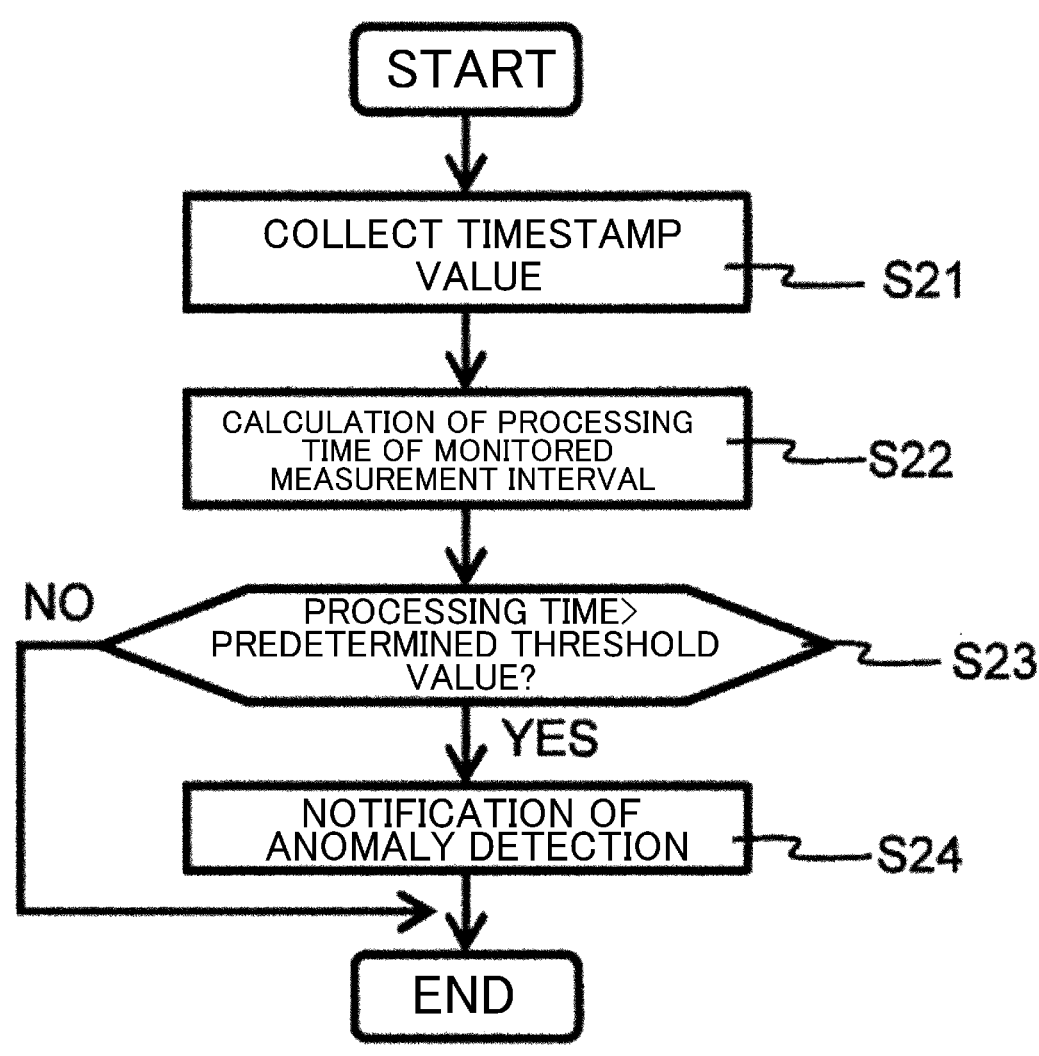
FIG. 5 is a flowchart diagram for explaining a control method of a computer system according to a second embodiment of the present invention.

FIG. 5 shows a flowchart of a control method of the computer system 10 according to this example.

First, for example, the arithmetic part 11_1 of the computer system 10 uses the plurality of event generators 16_1_1 to 16_2_N to collect the times when data passes through each of the event generators 16_1_1 to 16_2_N (Step S21).

Specifically, arithmetic part 11_1 collects timestamp values (for example, a first timestamp value and a second timestamp value) on the basis of the detection of a given event at each of the event generators located at different locations (e.g., event generator 16_1_1 and event generator 16_2_1).

Subsequently, the processing time, that is, the time required for passing through the specific section in the arithmetic part 11_1 is calculated by obtaining the difference between the collected first timestamp value and second timestamp value (Step S22).

Subsequently, the processing time is compared with a preset threshold value (Step S23).

As a result of the comparison, when the processing time is longer than the threshold value, a notification of the abnormality detection of the computer system 10 is provided (Step S24).

Thus, according to the computer system management method according to this example, it is possible to monitor whether the computer system is operating normally.

In addition, it is not necessary to perform time analysis processing on all data. For example, the time (processing time) required for passing through a specific section in the arithmetic parts 11_1 to 11_N at predetermined measurement intervals is observed and whether the computer system is operating normally can be monitored by determining whether the processing time is within a predetermined range or longer than a predetermined threshold value.

Furthermore, test data may be input and the time required for this data to pass through the arithmetic parts 11_1 to 11_N may be analyzed.

Although an example of measuring the processing time by directly using the timestamp value obtained by the event generator has been shown in this example, after recording the timestamp value in the trace buffer, the processing time may be measured using the timestamp value recorded in the trace buffer.

Although an example of ascertaining the state of the computer system using the processing time has been shown in this example, the present invention is not limited to this and the data flow rate or the like may be used.

Although an example in which the arithmetic part controls the computer system has been shown in this example, the host part may control the computer system.

In this example, the trace data may have a data type as well as a timestamp value. Furthermore, it may have an instance ID, an event type, and arbitrary data. Also, trace data may be recorded for each data type or event type.

Third Example

A control method of a computer system 10 according to a third example of the present invention will be described with reference to FIG. 6. In this example, in the computer system 10, flow management of the computer system 10 is performed using trace parts 14_1 to 14_N of arithmetic parts 11_1 to 11_N.

In the computer system 10, the trace parts 14_1 to 14_N of the arithmetic parts 11_1 to 11_N record timestamp values and instance IDs (information indicating locations in which events are detected) as trace data in a trace buffer 18 and a host part 12 reads the trace data.

Figure 6:
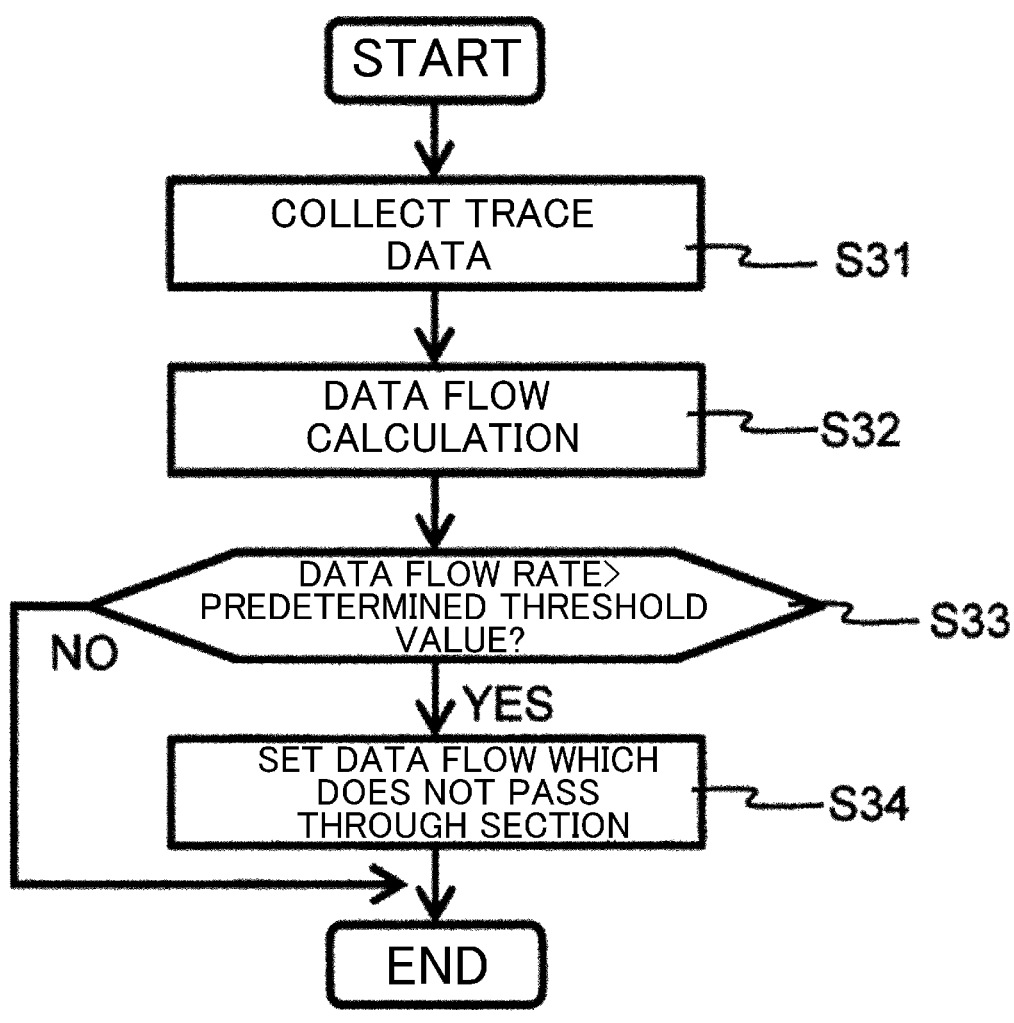
FIG. 6 is a flowchart diagram for explaining a control method of a computer system according to a third embodiment of the present invention.

FIG. 6 shows a flowchart diagram of a control method of the computer system 10 according to this example.

First, the host part 12 collects, as trace data from the trace buffer 18, a timestamp value and an instance ID (information indicating the location in which the event is detected) obtained by the event generator 16_1 at an arbitrary location for different events (Step S31).

Specifically, the event generator 16_1 collects the leading and trailing timestamp values stored in the trace buffer 18 upon detection of passing data events, for example, the leading and trailing ends.

Subsequently, a difference between the leading timestamp value and the trailing timestamp value is calculated as the data passage time.

Subsequently, the data volume (data flow rate) per unit time at a predetermined location is calculated by dividing the data volume of the preset input data (or output data) by the data passage time (Step S32).

Subsequently, the data flow rate is compared with a preset predetermined threshold value (Step S33).

When the result of the comparison is that the data flow rate is greater than the threshold value, the data flow (path) is set to avoid data crowding. For example, when assigning a route, a route is set by avoiding a route exceeding a predetermined threshold value ascertained by an instance ID (information indicating a location in which an event is detected) (Step S34).

As described above, according to the computer system management method according to this example, the data flow (path) can be set so as to avoid data concentration.

Although an example of measuring the processing time using the timestamp value recorded in the trace buffer has been shown in this example, the timestamp value acquired by the event generator may be used directly to measure the processing time.

Also, although an example in which the host part controls the computer system has been shown, the arithmetic part may control the computer system.

Also, if the trace data has information regarding the data type, the host part 12 can ascertain the operation state for each data type.

Thus, when data is concentrated only in a specific flow, the computer system 10 can avoid the concentration of data by transferring data from the flow to another flow with a lower load and perform flow management.

Also, in the trace data, instance IDs, event types, and arbitrary data may be recorded. Also, trace data may be recorded for each data type or event type.

Furthermore, the flow can be managed to set a bypass route for the flow when a failure occurs by detecting a failure which has occurred in a specific flow or a specific location.

In addition, when a failure occurs in an arithmetic part which has a plurality of flows with different data paths, after having other arithmetic parts avoid flows other than the relevant flow, replace, reset, or analyze the relevant arithmetic part.

<Measurement Example of Arithmetic Part>

An example of measuring the processing time and the data flow rate in the arithmetic part in the control method of the computer system 10 according to this example will be described with reference to FIGS. 7A and 7B.

In this measurement example, for example, input data is observed by the event generator 16_1_1 in the preceding stage of the calculator 15_1(1), and input data is observed by the event generator 16_2_1 in the latter stage.

The event generator 16_1_1 acquires the timestamp value of the top of the input data using when the top of the input data passes through the event generator 16_1_1 as a trigger of an event.

Similarly, the event generator 16_1_1 acquires the timestamp value of the end of the input data using when the end of the input data passes through the event generator 16_1_1 as a trigger of an event.

On the other hand, the leading timestamp value of the output data is obtained in the event generator 16_2_1 using when the head of the output data passes through the event generator 16_2_1 as a trigger of an event.

Similarly, a timestamp value of the end of the output data is obtained in the event generator 16_2_1 using when the end of the output data passes through the event generator 16_2_1 as a trigger of an event.

FIG. 7A shows an example of trace data. FIG. 7A shows timestamp values (Timestamp: Dec, Timestamp: ox), an instance ID (Ins), an event ID (Evt), a decoded event ID (Dec), TID, and event data (EventData).

In the decoded event ID (Dec), H indicates the head of data and L indicates the end of data.

The data volume of input data and output data is 1 MB. Also, the operating frequency of the arithmetic parts 11_1 to 11_N is 250 MHz, 4 ns/cycle).

The timestamp value (Timestamp: Dec) at the head of the input data is "406514" and the instance ID (Ins) is "10" (the upper part of the dotted square 41). Also, "H-R-" of the event ID (Dec) indicates the passing of the head of the data as event occurrence.

Similarly, the timestamp value (Timestamp: Dec) at the head of the output data is "401656" and the instance ID (Ins) is "11" (bottom inside dotted line square 41). Also, "H-R-" of the event ID (Dec) indicates the passing of the head of the data as event occurrence.

Also, the timestamp value (Timestamp: Dec) at the end of the input data is "547791" and the instance ID (Ins) is "10" (the upper part of the dotted line square 42). Also, "-LR-" of the event ID (Dec) indicates passage of the end of data as event occurrence.

Similarly, the timestamp value (Timestamp: Dec) at the head of the output data is "547794" and the instance ID (Ins) is "11" (bottom inside dotted line square 42). Also, "-LR-" of the event ID (Dec) indicates passage of the end of data as event occurrence.

Figure 7B:
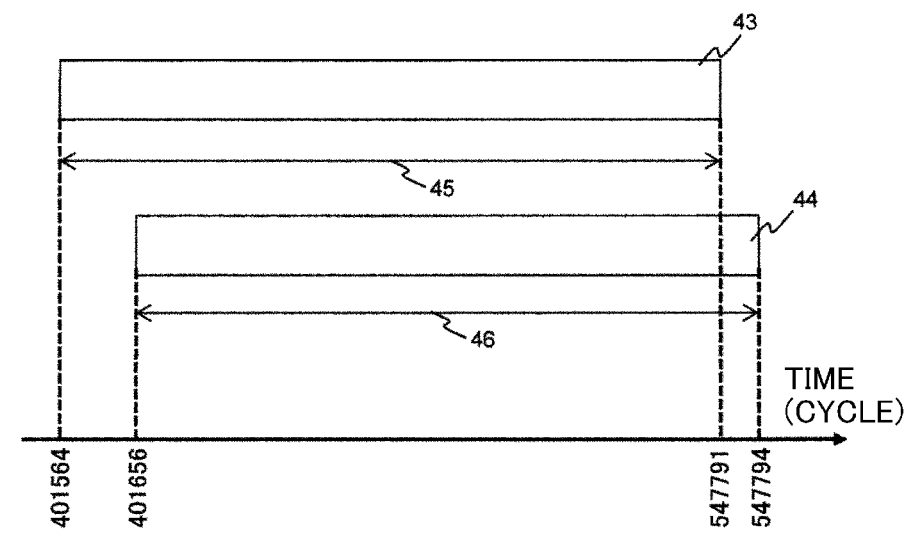
FIG. 7B is a diagram for explaining an example of a computer system control method according to the first embodiment of the present invention.

FIG. 7B schematically shows a relationship between the input data 43 and the output data 44. A time for the input data 43 to pass through the event generator 16_1_1 is calculated as 146227 cycles=584.9 usec from the difference (arrow 45) between the end timestamp value (547791 cycles) and the start timestamp value (401564 cycles). Therefore, 1 MB/584.9 μsec=approximately 1.8 GB/sec is obtained as the input throughput, that is, data flow rate.

Similarly, the input throughput, that is, the data flow rate can be calculated from the difference (arrow 46) between the end timestamp value and the start timestamp value of the output data 44.

In this way, the data flow rate is obtained by dividing the data amount by the difference between the leading and trailing timestamp values of the data in the calculation unit.

Also, as the processing time (latency), 92 cycles are obtained from the difference between the timestamp values of the start of output and the start of input, that is, a difference between the top timestamp value of the output data 44 (401656 cycles) and the top timestamp value of the input data 43 (401564 cycles).

In this way, the processing time of the input data in the arithmetic part is obtained from the difference between the timestamp values at the start of output and the start of input.

As described above, in the control method of the computer system according to the present invention, the timestamp values of the input data and the output data can be used for obtaining the data processing time and data flow rate.

Effects

According to the computer system and the management method thereof according to the embodiments and examples of the present invention, when arithmetic processing in a computer system stops midway or when processing is not completed normally, it is possible to easily detect and identify the arithmetic unit whose processing has stopped among a plurality of arithmetic parts.

Furthermore, since the trace buffer 18 records the data, the processing can be restarted from the middle of the process. As a result, there is no need to repeat the already performed process from the beginning. Moreover, the processing time can be shortened when the processing is not completed normally.

In addition, since the host part 12 can centrally manage the state of each operation part, for example, it is possible to set a flow of data that does not pass through an operation unit whose processing has stopped and reduce the number of data whose processing is not normally completed.

In addition, since events can be detected for each data type (user ID, session ID, stream ID, service ID) and trace data can be accumulated, quality control and failure analysis can be easily performed by focusing on a specific data type.

Furthermore, since the trace parts 14_1 to 14_N are provided independently of the arithmetic parts, the abnormal state of the arithmetic parts can be maintained.

In addition, the flow can be managed at the granularity of each user (each session).

Also, since an event generator for event detection can be inserted in any part, it is possible to detect defects that occur only in a specific flow.

Second Embodiment

A computer system and a control method thereof according to a second embodiment of the present invention will be described with reference to FIG. 8. A computer system 10 according to this embodiment has a configuration similar to that of the first embodiment.

In the computer system 10 according to the first embodiment, a trace buffer 18 overflows, making it difficult to record trace data. Therefore, it is necessary to erase the trace data.

<Control Method of Computer System>

Figure 8:
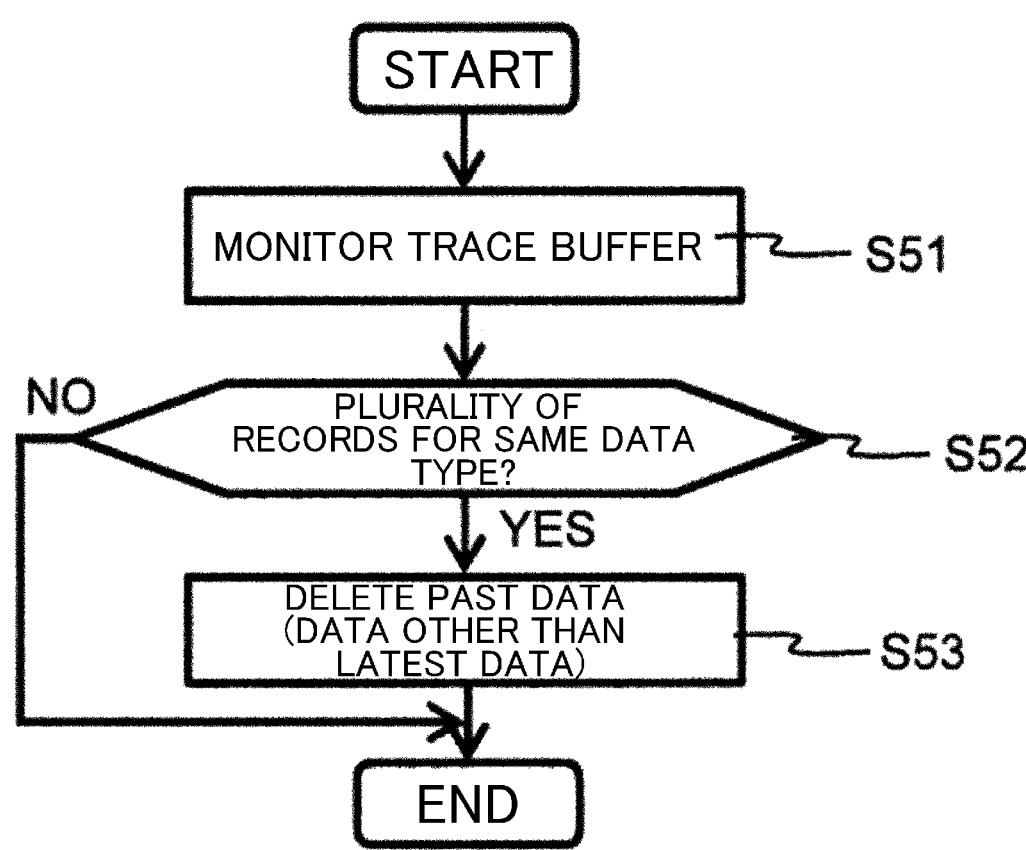
FIG. 8 is a flowchart diagram for explaining a computer system control method according to the second embodiment of the present invention.

FIG. 8 shows a flowchart of the control method of the computer system according to this embodiment.

In the computer system according to this embodiment, at least the data type is recorded as trace data in the trace buffer 18 together with the timestamp value. Here, instance IDs, event types, and arbitrary data may be recorded as trace data. Alternatively, trace data may be recorded for each data type or event type.

First, a host part 12 monitors trace buffers 18 of arithmetic parts 11_1 to 11_N at predetermined intervals (Step S51).

Subsequently, it is determined whether a plurality of pieces of trace data for the same data type are recorded in the trace buffer 18 (Step S52).

As a result of determination, when a plurality of pieces of trace data for the same data type are recorded in the trace buffer 18, among the plurality of pieces of trace data, the trace data with the latest timestamp value is held (recorded) and the trace data recorded in the past (trace data other than the latest trace data) is erased (Step S53). Thus, the event detection time recorded in the trace buffer is erased based on the event detection time.

According to the computer system and the control method thereof according to this embodiment, even if the storage capacity of trace buffer 18 is limited, buffer overflow can be minimized and the physical buffer capacity can be reduced.

Moreover, since it is not necessary to install an excessive amount of buffers, the power consumption of the arithmetic part can be reduced and the power efficiency can be improved.

In addition, by recording trace data for each data type (user ID, session ID, stream ID, service ID), for a specific data type (for example, the highest priority service), it is possible to provide a computer system with high flexibility such as increasing reliability by retaining trace data for a relatively long time.

Furthermore, this embodiment naturally has the same effect as that in the first embodiment.

Modified Example 1 of Second Embodiment

A computer system and a control method thereof according to Modified Example 1 of the second embodiment of the present invention will be described. A computer system 10 according to this Modified Example has a configuration similar to that of the first embodiment.

In the computer system according to this Modified Example, at least the data type is recorded as trace data in the trace buffer 18 along with the timestamp value. Here, instance IDs, event types, and arbitrary data may be recorded as trace data. Alternatively, trace data may be recorded for each data type or event type.

In this Modified Example, the arithmetic parts 11_1 to 11_N of the computer system 10 check the trace data (latest trace data) received from the event generators 16_1_1 to 16_2_N to determine whether trace data of the same data type as the latest trace data is recorded among the trace data already held by the trace buffer 18 before recording (writing) to the trace buffer 18.

As a result of judgment, when trace data of the same data type is recorded, the data already held (data other than the latest data) is erased, and then the latest trace data is recorded, that is, the latest trace data is overwritten. Thus, the detection time of the event recorded in the trace buffer is overwritten on the basis of the detection time of the event.

Here, a flag or the like may be added to prevent overwriting, and whether overwriting is permitted may be determined based on the presence or absence of the flag.

This provides the same effects as in this embodiment.

Modified Example 2 of Second Embodiment

A computer system and a control method thereof according to Modified Example 2 of the second embodiment of the present invention will be described. A computer system 10 according to this Modified Example has a configuration similar to that of the first embodiment.

In the computer system according to this Modified Example, at least a timestamp value is recorded in the trace buffer 18 as trace data. Here, data type, an instance ID, an event type, and arbitrary data may be recorded as trace data. Alternatively, trace data may be recorded for each data type or event type.

In this Modified Example, first, the data processed by the arithmetic part 15_1(1) is transmitted from the arithmetic part 15_1(1) of the arithmetic part 11_1 in the preceding stage to the arithmetic part 15_1(2) of the arithmetic part 11_2 in the following stage.

Subsequently, the arithmetic part 11_2 in the latter stage sends a reception completion notification to the arithmetic part 11_1 in the previous stage.

Finally, if the preceding stage arithmetic part 11_1 receives the reception completion notification from the succeeding stage arithmetic part 11_2, it erases the data in the trace buffer 18 of the preceding stage arithmetic part 11_1.

Alternatively, the arithmetic part 11_2 in the subsequent stage may send a reception completion notification to the host part 12 and the data in the trace buffer 18 of the arithmetic part 11_1 in the preceding stage may be erased according to an instruction of the host part 12. This provides the same effects as in this embodiment.

Also, in this embodiment, when the host part 12 having a larger memory capacity than the trace buffer 18 collects and records the data in the trace buffer 18, the data in the trace buffer 18 may be erased with the collection of data by the host part 12 or the completion of collection as a trigger.

Furthermore, in this embodiment, the data in the trace buffer 18 may be erased when a preset time elapses.

Third Embodiment

A computer system and a control method thereof according to a third embodiment of the present invention will be described. A computer system 10 according to this embodiment has a configuration similar to that of the first embodiment.

Since a plurality of operation parts operate in conjunction in the computer system 10 according to the first embodiment, it is difficult to synchronize the times of timestamps measured by a plurality of arithmetic parts.

Particularly, when the operating frequencies of the arithmetic parts are different, it is difficult to synchronize the timestamps because the values of the clock counters based on the operating frequencies are different.

<Control Method of Computer System>

Figure 9:
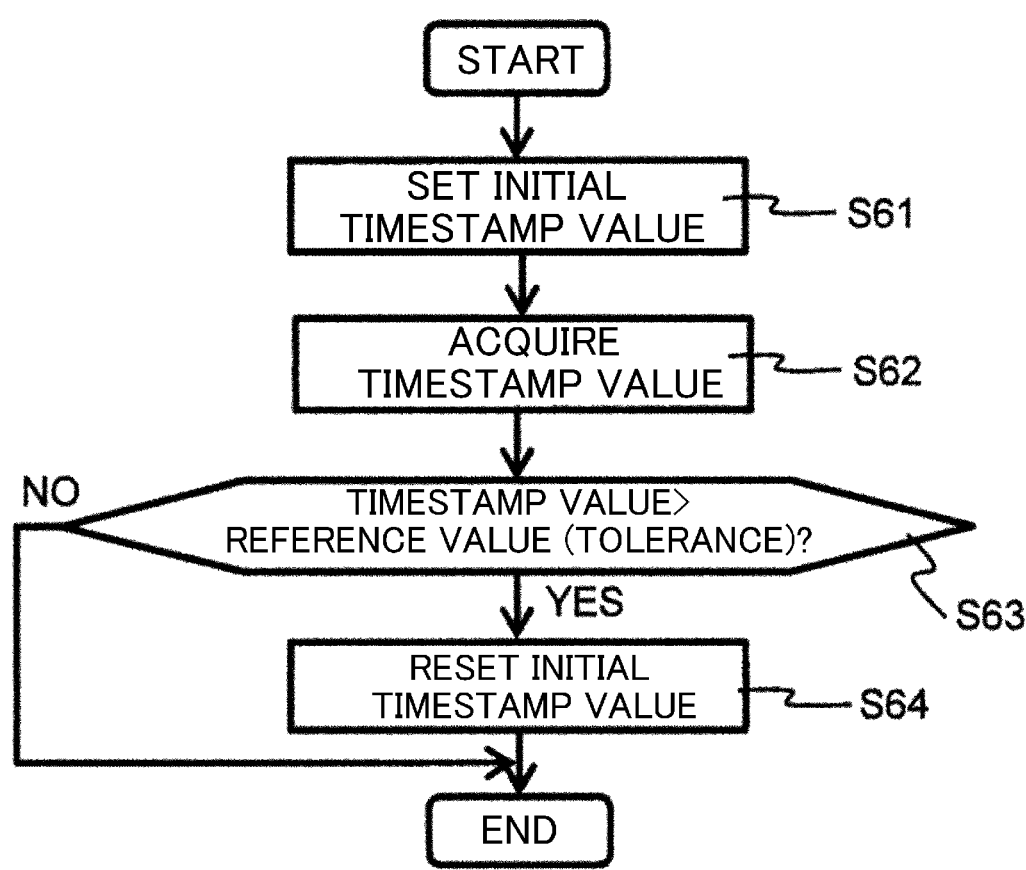
FIG. 9 is a flowchart diagram for explaining a control method of a computer system according to the second embodiment of the present invention.

In the computer system and the control method thereof according to this embodiment, the host part 12 centrally sets the timestamp value to a predetermined value, for example, an initial value. FIG. 9 shows a flowchart of the control method of the computer system according to this embodiment.

First, the host part 12 sets a predetermined value as the initial value of the timestamp value (Step S61).

Here, the initial value may be a timestamp value when the arithmetic parts 11_1 to 11_N start measuring the input data.

Alternatively, the host part 12 may write the start of counting to the timestamp part 17 and the timestamp value at the start of counting may be used as the initial value.

Subsequently, each of the arithmetic parts 11_1 to 11_N acquires a timestamp value (Step S62).

Subsequently, the host part 12 compares the obtained timestamp value with a predetermined reference value for the timestamp value (Step S63).

Here, a predetermined reference value for the timestamp value is set in advance. The predetermined reference value indicates the allowable range of deviation of the timestamp value from a predetermined value, for example, the initial value.

Finally, when the timestamp value of each of the arithmetic parts 11_1 to 11_N exceeds the allowable range of the predetermined reference value, the host part 12 resets the timestamp values of the arithmetic parts 11_1 to 11_N to predetermined values, for example, initial values (Step S64).

According to the computer system and the control method thereof according to this embodiment, when arithmetic parts with different operating frequencies coexist (for example, when the operating frequencies differ depending on the calculation contents of the arithmetic parts), the timestamp value can be handled in a unified manner. Thus, it can be easily analyzed after the trace data is collected.

In addition, since it is possible to easily synchronize a plurality of arithmetic parts, it is possible to improve the scale-out performance.

Furthermore, since the host part 12 centrally sets the timestamp value to a predetermined value, for example, an initial value at the start of measurement or the like, it is possible to easily correct the deviation of the clock counters between the arithmetic parts.

Furthermore, this embodiment naturally has the same effect as the first embodiment.

Modified Example 1 of Third Embodiment

A computer system and a control method thereof according to Modified Example 1 of the third embodiment of the present invention will be described. A computer system 10 according to this modification has a configuration similar to that of the first embodiment.

In this modified example, when the frequencies differ among the arithmetic parts 11_1 to 11_N, the host part 12 adjusts the difference in the operating frequencies of the arithmetic parts 11_1 to 11_N.

For example, when the frequency of the arithmetic part 11_1 is 100 MHZ and one clock cycle is 10 nanoseconds and the frequency of the arithmetic part 11_2 is 200 MHZ and one clock cycle is 5 nanoseconds, the host part 12 doubles the timestamp value of the arithmetic part 11_1, thereby synchronizing the timestamp values of the arithmetic parts 11_1 and 11_2.

Furthermore, the host part 12 may synchronize the timestamp values of the arithmetic parts 11_1 and 11_2 by multiplying the timestamp value of the arithmetic part 11_2 by ½.

Also, after the host part 12 reads out the trace data, a conversion reference value (for example, 100 MHZ) may be provided and the counter values of all the arithmetic parts may be converted according to the reference value of 100 MHZ.

In this way, in the computer system and the control method thereof according to this modified example, the host part multiplies the timestamp value of the other arithmetic part (for example, arithmetic part 11_2) by a coefficient set in another arithmetic part (for example, arithmetic part 11_2) so that the operating frequency of one arithmetic part (for example, arithmetic part 11_1) is the same as the operating frequencies of other arithmetic parts (for example, arithmetic part 11_2). Here, a plurality of other arithmetic parts may be provided. In this way, the difference between the counter values which differ for each calculation unit is adjusted.

Thus, the counter values of the respective arithmetic parts become the same so that the same effects as in this embodiment are obtained.

Modified Example 2 of Third Embodiment

A computer system and a control method thereof according to Modified Example 2 of the third embodiment of the present invention will be described. A computer system 10 according to this modified example has a configuration similar to that of the first embodiment.

In this modified example, when the frequencies differ among the arithmetic parts 11_1 to 11_N, the differences in operating frequencies are adjusted in the arithmetic parts 11_1 to 11_N.

First, different conversion values (coefficients) are set in advance according to the frequency for each calculator. For example, when the frequency of the arithmetic part 11_1 is 100 MHZ and the frequency of the arithmetic part 11_2 is 200 MHZ, assuming that the reference value is 100 MHZ, the conversion value (coefficient) of the arithmetic part 11_1 is "1" and the conversion value (coefficient) of the arithmetic part 11_2 is "½".

Subsequently, before recording the timestamp value in the trace buffer 18, a value obtained by multiplying the timestamp value by a conversion value (coefficient) is recorded.

Also, after recording the timestamp value in the trace buffer 18, the same conversion may be performed when reading the clock counter value.

In this way, in the computer system and the control method thereof according to this modified example, the timestamp value of another arithmetic part (for example, arithmetic part 11_2) is multiplied by a coefficient set in another arithmetic part (for example, arithmetic part 11_2) so that the operating frequency of one arithmetic part (for example, arithmetic part 11_1) is the same as the operating frequency of another arithmetic part (for example, arithmetic part 11_2) before the trace buffer of the arithmetic part. Here, a plurality of other arithmetic parts may be provided. In this way, the difference between the counter values which differ for each arithmetic part is adjusted.

Thus, the counter values of the respective arithmetic parts become the same so that the same effects as in this embodiment are obtained.

In the embodiment of the present invention, when the arithmetic part measures a processing time, a data flow rate, and the like and determines defects and the like, an arithmetic part in the arithmetic part may perform the processing or processing functions such as measurement and determination may be separately provided in the arithmetic part.

In the embodiment of the present invention, further effects can be obtained by combining the first embodiment, the second embodiment, and the third embodiment.

Although an example of the structure, dimensions, materials, and the like of each component has been shown in the configuration of the computer system, the management method, and the like in the embodiment of the present invention, the present invention is not limited to this. It may be anything as long as it exhibits the functions of the computer system and produces an effect.

INDUSTRIAL APPLICABILITY

The present invention can be applied to computer systems in the field of information processing.

REFERENCE SIGNS LIST

10 Computer system
11_1 to 11_N Arithmetic part
12 Host part
13 Internal communication part
14_1 to 14_N Trace part

The invention claimed is:

1. A computer system, comprising:
a plurality of arithmetic parts; and
a host part connected to the plurality of arithmetic parts and configured to control the plurality of arithmetic parts,
wherein processed data is transferred between the plurality of arithmetic parts,
each arithmetic part includes a trace part which record trace data using detection of a predetermined event from input data as a trigger,
the trace data has a timestamp value which is a detection time of the event based on an operating frequency of a respective arithmetic part, and
the timestamp values of the plurality of arithmetic parts are synchronized,
wherein the computer system processes input data through the plurality of arithmetic parts, the computer system further comprises an internal communication part configured to transfer the processed data between the plurality of arithmetic parts, each trace part comprises event generators disposed at observation points, a timestamp part, and a trace buffer configured to record the trace data, the trace data including an instance ID identifying a location where the event is detected, and the host part configured to measure a processing time by calculating a difference between timestamp values from different observation points and detect a failure when the processing time exceeds a predetermined threshold.

2. The computer system according to claim 1, wherein the trace data further includes a type of the input data, information indicating a location in which the event is detected, information distinguishing the content of the event, or arbitrary data.

3. The computer system according to claim 1, wherein the host part sets the timestamp value to a predetermined value when the timestamp value exceeds an allowable range of a reference value.

4. The computer system according to claim 1, wherein either the host part or each arithmetic part is configured to adjust a difference between counter values which are different for each of the arithmetic parts.

5. The computer system according to claim 1, further comprising:
a plurality of host parts.

6. A method for controlling a computer system which includes a plurality of arithmetic parts and a host part, wherein the computer system processes input data through the plurality of arithmetic parts and further comprises an internal communication part configured to transfer processed data between the plurality of arithmetic parts, wherein each arithmetic part includes a trace part comprising event generators disposed at observation points, a timestamp part having a clock counter, and a trace buffer configured to record trace data, the trace data including an instance ID identifying a location where an event is detected, in which the plurality of arithmetic parts obtain a timestamp value on the basis of an operating frequency of the arithmetic parts using detection of a predetermined event from input data as a trigger, and the data is processed and recorded, the method comprising:

measuring, by the host part, a processing time by calculating a difference between timestamp values from different observation points;

detecting, by the host part, a failure when the processing time exceeds a predetermined threshold;

setting, by the host part, a predetermined value to the timestamp value;

comparing, by the host part, the timestamp value with a reference value; and setting, by the host part, the timestamp value to the predetermined value when the timestamp value exceeds an allowable range of the reference value to synchronize the timestamp values of the plurality of arithmetic parts.

7. The method of claim 6 wherein either one of the host part and the arithmetic parts multiplies a timestamp value acquired by each of the other arithmetic parts by a coefficient set in each of the other arithmetic parts so that an operating frequency of one arithmetic part of operating frequencies of the plurality of arithmetic parts is the same as operating frequencies of the other arithmetic parts.

8. The method of claim 6, wherein the trace data further includes arbitrary data, and the method further comprises:

restarting processing using the arbitrary data recorded in the trace buffer when the failure is detected.

9. The method of claim 6, further comprising:

calculating, by the host part, a data flow rate by dividing a data volume by a data passage time, wherein the data passage time is calculated from a difference between a leading timestamp value and a trailing timestamp value of data passing through one of the observation points; and comparing the data flow rate with a predetermined threshold value.

10. The method of claim 9, further comprising:

setting, by the host part, a data flow path that avoids a location where the data flow rate exceeds the predetermined threshold value, wherein the location is identified by the instance ID.

11. The method of claim 6, wherein the trace data further includes a data type, and the method further comprises:

monitoring, by the host part, the trace buffer at predetermined intervals;

determining whether a plurality of pieces of trace data for a same data type are recorded in the trace buffer; and when the plurality of pieces of trace data for the same data type are recorded, erasing trace data with older timestamp values while retaining trace data with a latest timestamp value.

12. The method of claim 7, wherein:

the operating frequency of a first arithmetic part of the plurality of arithmetic parts is different from an operating frequency of a second arithmetic part of the plurality of arithmetic parts, and the coefficient is set to convert a timestamp value from the second arithmetic part to correspond to the operating frequency of the first arithmetic part.

13. A computer system, comprising:

a plurality of arithmetic parts, each arithmetic part including:

a trace part comprising event generators disposed at observation points and configured to detect a predetermined event from input data, a timestamp part having a clock counter configured to generate a timestamp value based on an operating frequency of the arithmetic part, and a trace buffer configured to record trace data including the timestamp value and an instance ID identifying the observation point where the event is detected;

an internal communication part configured to transfer processed data between the plurality of arithmetic parts; and a host part connected to the plurality of arithmetic parts and configured to:

calculate a data flow rate at one of the observation points by dividing a data volume by a data passage time, wherein the data passage time is calculated from a difference between a leading timestamp value and a trailing timestamp value of data passing through the observation point, compare the data flow rate with a predetermined threshold value, and when the data flow rate exceeds the predetermined threshold value, set a data flow path that avoids the observation point identified by the instance ID.

14. The computer system according to claim 13, wherein the trace data further includes a data type, and the host part is configured to ascertain an operation state for each data type based on the data type included in the trace data.

15. The computer system according to claim 13, wherein the trace data further includes an event type, and the event type distinguishes between a head of a stream and an end of the stream.

16. The computer system according to claim 13, wherein the host part is further configured to:

read the trace data from the trace buffer; and visualize the trace data in a time graph format.

17. The computer system according to claim 13, wherein:

the trace part is configured to detect the predetermined event based on at least one of:

a head of data passing through the observation point, an end of data passing through the observation point, a data type associated with the input data, or a detection flag in the input data.

\* \* \* \* \*